United States Patent [19]

Graham et al.

[11] Patent Number: 4,995,503
[45] Date of Patent: * Feb. 26, 1991

[54] STARWHEEL CAP SELECTING APPARATUS

[76] Inventors: S. Neal Graham, 12997 Fauns Ridge, Fishers, Ind. 46038; Thomas E. Terry, 328 N. West St., Tipton, Ind. 46072

[*] Notice: The portion of the term of this patent subsequent to Jan. 23, 2007 has been disclaimed.

[21] Appl. No.: 430,496

[22] Filed: Nov. 1, 1989

Related U.S. Application Data

[63] Continuation of Ser. No. 198,831, May 26, 1988, Pat. No. 4,895,243.

[51] Int. Cl.$^5$ ............................................. B65G 47/24
[52] U.S. Cl. ..................................... 198/392; 198/395
[58] Field of Search ............... 198/392, 395, 398, 399, 198/388; 193/44, 46; 221/161, 162, 167

[56] References Cited

U.S. PATENT DOCUMENTS

| | | | |
|---|---|---|---|
| 3,065,841 | 11/1962 | Stover | 198/392 |
| 3,260,347 | 7/1966 | Barnes | 198/398 |
| 3,261,442 | 7/1966 | Beck | 193/46 |
| 3,570,642 | 3/1971 | Shenoha | 193/45 |
| 3,635,325 | 1/1972 | Sterling | 198/398 |
| 3,726,385 | 4/1973 | Sterling | 198/398 |
| 3,811,551 | 5/1974 | Eddy | 198/388 |
| 4,709,798 | 12/1987 | Herzog | 198/392 |
| 4,884,678 | 12/1989 | Graham et al. | 198/392 |
| 4,895,243 | 1/1990 | Graham et al. | 198/392 |

Primary Examiner—Joseph E. Valenza
Attorney, Agent, or Firm—Woodard, Emhardt, Naughton Moriarty & McNett

[57] ABSTRACT

An orbital cap selection and feeding device is disclosed having a disk rotating within a circular frame so that caps disposed on the disk tend to move by centrifugal force to the perimeter of the disk. Caps lying flat on the disk move into a collector chute, which blends into a guide chute that is adapted to retain and protect a procession of caps within the guide chute about 180 degrees to a discharge chute. Part way along the length of the guide chute is a primary cap selecting station having an optical sensor that senses the orientation of caps in the procession and generates a signal when an improperly oriented cap is encountered. The signal activates an ejection airjet downstream of the optical sensor to displace the improperly oriented cap from the guide chute and back into the interior of the rotating on disk. A secondary cap selecting station is situated downstream of the optical sensing station, which includes a starwheel cap selecting apparatus to eject any improperly oriented caps that pass through the first sensing station. The secondary cap selecting station includes a self-clearing capability in which a starwheel, rotated by the procession of caps, interrupts the procession of caps when an improperly oriented cap is encountered, such that the improperly oriented cap is ejected back onto the working surface by action of the starwheel, the rotating disk, and the upstream procession of caps.

6 Claims, 5 Drawing Sheets

DIRECTION OF FEED

STARWHEEL CAP SELECTING APPARATUS

The present application is a continuation of U.S. patent application Ser. No. 198,831 now U.S. Pat. No. 4,895,243 by the same inventor, filed 5-26-88.

BACKGROUND OF THE INVENTION

The present invention relates to a device for automatically sorting elements, such as caps, and feeding the elements to a discharge point in a specific orientation.

Apparatus for sorting articles from a mixed mass of articles on an inclined rotating surface and arranging the articles in single file for discharge, is available in the art. Apparatus of this sort, also referred to as orbital selecting or sorting devices, utilize centrifugal force to transfer the articles on the rotating surface to the perimeter of the surface for selecting or sorting.

The apparatus described in Glaude, U.S. Pat. No. 2,388,405, allows selection based on the orientation of open-ended hollow caps. In this apparatus, selection is performed by a stationary member that, in essence, pulls properly oriented caps off of the rotating surface and into the discharge chute. In this device, the selection process must occur at the lowest point on the incline device so that the parts or the elements may be fed off of the rotating surface.

One problem with the orbital sorting devices of the prior art is the feeding speed of the devices has been limited to a maximum of about 1100 parts per minute. Devices that attempt to properly orient the elements to be sorted prior to entry into the discharge chute typically have the lowest freed rate. Apparatus such as in Glaude allow higher feed rates by discharging the improperly oriented parts and feeding only the properly oriented parts. There is a need for an orbital sorting device that produces a high feed rate of properly oriented parts to the discharge chute, with virtually 100% accuracy.

A device described in Applicants' co-pending utility application, Ser. No. 101,853, uses an optical sensor to sense the orientation of caps at the periphery of a rotating disk. An airjet is triggered by a signal from the optical sensor to eject improperly oriented caps back into working surface of the disk. Applicants' prior device allows very high feed rates, exceeding 3000 parts per minute, at a very high orientation accuracy. The device described in Applicants' Ser. No. 101,853 is a high-speed device, but an apparatus is still not available that combines high feed rates with virtual 100% accuracy.

Some devices of the prior art have employed a starwheel or a pinwheel to sort properly oriented caps. In devices of this type, high sorting accuracy is achieved by having arms of a rotating starwheel enter the open end of a cap, or strike the closed end of the cap, depending on the cap orientation. In the patent to Shenoha, U.S. Pat. No. 3,570,642, a rotating pinwheel is situated in an exit chute. The pinwheel pins engage the open end of properly oriented caps to restrain them against ejection by a striker bar. Apparatus described in Belada, U.S. Pat. No. 2,270,713, and Eddy, U.S. Pat. No. 3,811,551 use a pair of starwheels to extract an improperly oriented cap from on section of an exit chute. None of these devices employ a starwheel to select parts on a rotating disk. Other key differences will be made apparent by the following description.

It is an object of the present invention to provide an apparatus that is capable of high feed rates in an orbital sorting device and that is as infallible as possible in feeding only properly oriented elements. Further objects and benefits of the present invention will be apparent from the ensuing description and accompanying figures.

SUMMARY OF THE INVENTION

One embodiment of the invention might include an apparatus for feeding caps having a disk rotatable about its normal axis and having a peripheral portion and a working surface, on which caps to be sorted are disposed. The disk is situated within a containment structure to contain caps on the working surface during rotation of the disk. The disk also includes a peripheral rim to contain caps displaced to the peripheral portion by operation of centrifugal force. A primary cap selecting station is provided for selecting properly oriented caps from a procession of caps rotating with the disk at the peripheral portion. The primary cap selecting station is operable to eject improperly oriented caps onto the working surface. A secondary cap selecting station is situated rotationally downstream from the primary cap selecting station, and is operable to eject improperly oriented caps passing the primary selecting device. The secondary cap selecting station is self-clearing and includes a device for interrupting the procession of caps when an improperly oriented cap is encountered and for ejecting the improperly oriented cap onto the working surface, thereafter allowing the procession of caps to continue on the peripheral portion. A stationary discharge chute intersecting the peripheral portion receives the properly oriented caps passing the secondary cap selecting station for feeding into another machine.

Another embodiment of the invention might include an apparatus for feeding caps having a disk rotatable about its normal axis and having a peripheral portion on a working surface. There is provided means for containing caps disposed on the disk during the rotation of the disk, each of which caps has a closed end and an open end. There is also provided cap selecting means for selecting properly oriented caps from a procession of caps rotating with the disk at the peripheral portion and for rejecting improperly oriented caps onto said working surface. The cap selecting means includes self-clearing means for interrupting said procession of caps when an improperly oriented cap is encountered and for rejecting the improperly oriented cap onto the working surface. The self-clearing means includes a starwheel rotatable over the peripheral portion and having a plurality of spokes, each having a tip. Each of the spokes is adapted to enter the open end of a properly oriented cap adjacent the tip whereby the spokes entering the open end of the properly oriented caps rotating with said rotating disk are contacted by the properly oriented caps causing the starwheel to rotate. The starwheel is arranged above the peripheral portion such that the tip of consecutive ones of the plurality of spokes enter the open ends of consecutive properly oriented caps when the starwheel is rotating and at least one of the plurality of spokes contacts the closed end of an improperly oriented cap thereby interrupting the rotation of the starwheel. A stationary discharge chute intersects the peripheral portion for feeding properly oriented caps after they have passed the cap selecting means.

DESCRIPTION OF THE PREFERRED EMBODIMENT

Figure 1:
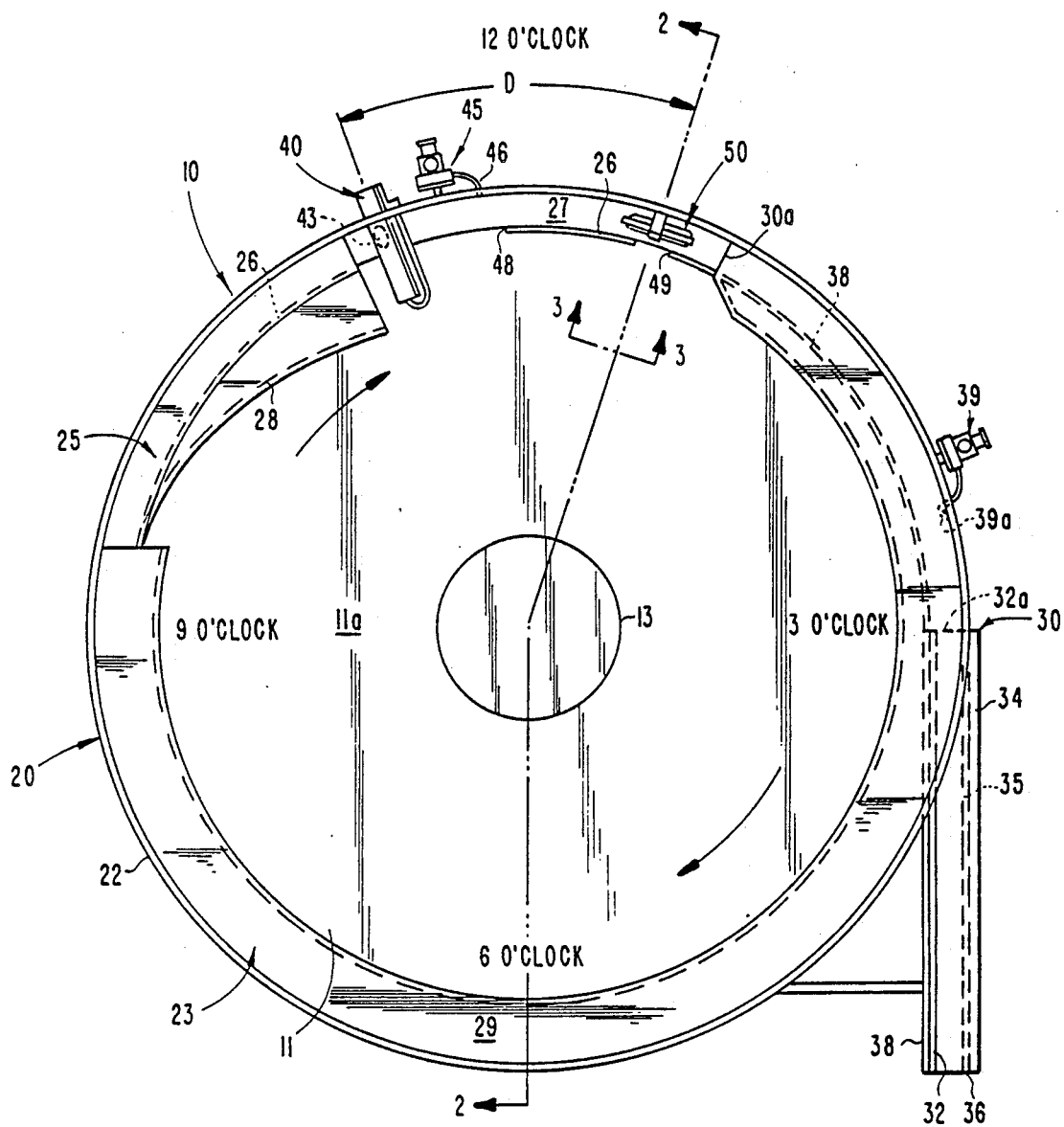
FIG. 1 is a top elevational view of an orbital cap selecting device employing the starwheel cap selecting apparatus of the present invention.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Figure 2:
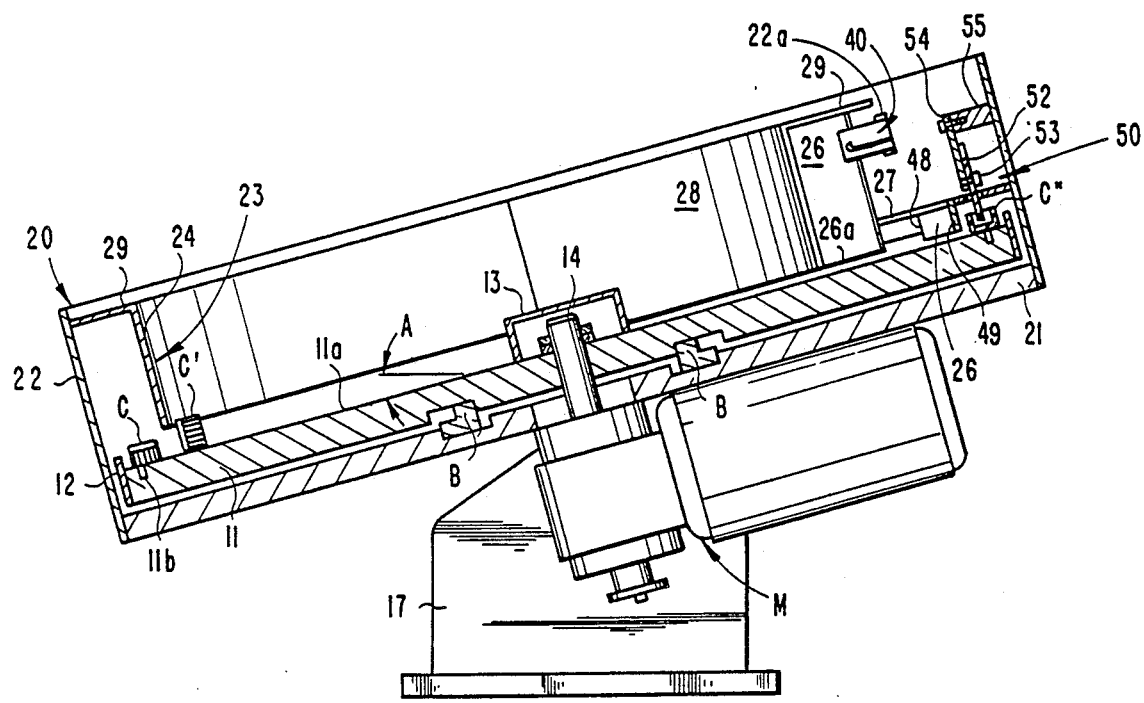
FIG. 2 is a side cross-sectional view taken along the line 2—2 in FIG. 1, as viewed in the direction of the arrows.

The orbital cap selection device of the present invention is similar, in several respects, to the device described in Applicants' co-pending application, Ser. No. 101,853, which is incorporated herein by reference. Referring to FIG. 1, the orbital cap selection device 10 is shown as comprising a disk 11 rotating within a circular frame 20. The disk 11 includes a working surface 11a upon which the articles to be sorted are disposed. Disk 11 rotates in the direction of the arrows about a hub 13. A frame 20 includes an outer circumferential wall 22 that is integral with the base 21, as shown in FIG. 2.

Referring again to FIG. 2, bearings B are situated between disk 11 and base 21 so that disk 11 rotates atop the base. A drive shaft 14 extends through base 21 and disk 11 and is bolted to disk 11 underneath hub 13. Motor M, mounted to the underside of base 21, is used to drive shaft 14 to rotate disk 11. The orbital cap selection device 10 is supported by mount 17, which is itself mounted to a level surface, such as a table. The base 21 of the device is pivotally attached to mount 17 so that the device can be situated at some angle A relative to the horizontal. The tilting of the base 21 is about an axis extending from the three o'clock to the nine o'clock position, as defined in FIG. 1.

The preferred angle A of operation of the working surface 11a for the present embodiment has been found to be about 15 degrees. The angle A of the working surface 11a insures that the caps C will enter collector chute 23 (FIGS. 1 and 2) at the lowest portion (six o'clock) of the device. The angle A of working surface 11a also aids air ejection assembly 45, which is mounted to the frame 20 rotationally upstream of the 12 o'clock position shown in FIG. 1, in ejecting improperly oriented caps from the guide chute 25 into the working surface 11a. Finally, the 15 degree angle also assists properly oriented caps exiting the device through the discharge chute assembly 30 (FIG. 1). To further assists the feeding of properly oriented caps into the discharge chute assembly 30, selection device 10 is also tilted at about a five degree angle about an axis from the twelve to the six o'clock positions on device 10.

The components of the frame 20 can be welded or bolted together in a conventional manner. Referring again to FIGS. 1 and 2, frame 20 includes an outer circumferential wall 22 with collector chute 23 and guide chute 25 affixed thereto. Collector chute 23 is formed by upper wall 29 and containment shell 24, as illustrated in FIG. 2. The lower edge of the containment shell 24 is displaced sufficiently above rotating disk 11 so that a cap C lying flat on the disk can pass under containment shell 24, while a cap standing on end, such as cap C', cannot pass under the shell into collector chute 23. As shown in FIG. 2, caps randomly disposed on working surface 11a will fall by gravity against the containment shell 24 due to the incline angle A of the rotating disk 11. The action of centrifugal force on the caps due to the rotation of disk 11, along with the caps bouncing against each other and the containment shell, tends to cause the caps to fall flat against the disk 11, such as cap C. When so oriented, cap C slides underneath the containment shell by action of centrifugal force and is contained on the disk 11 by the rim 12 fixed to and extending around the perimeter of the disk.

As cap C is carried around device 10 by the rotation of the disk 11, it proceeds into a guide chute 25. Guide chute 25 is partially defined by guide shell 26, as shown in FIG. 2, which has a lower edge 26a very near the working surface 11a of disk 11. The proximity of the lower edge 26a of guide shell 26 to disk 11 ensures that no other caps may enter the guide chute 25 without having first passed through the collector chute 23, in order to avoid disruption of the procession of caps around guide chute 25. The guide chute also includes upper guide wall 27 fixed between the shell 26 and circumferential wall 22 and forming the top of guide chute 25.

Guide chute 25 extends generally from the nine o'clock position on orbital cap selection device 10, as labeled on FIG. 1, about 180 degrees around the circumference to the three o'clock position. At approximately the 3 o'clock position, the guide chute 25 directs properly oriented caps into the discharge chute assembly 30. The guide shell 26 of the guide chute spans from the lower edge 26a to the upper wall 29 from the nine o'clock position to nearly the eleven o'clock position adjacent the sensor assembly 40, to be described herein. At this point, the guide shell 26 is shortened to span from the lower edge 26a to the upper guide wall 27. The guide shell 26 includes a gap forming a first ejection opening 48, from about the eleven o'clock to the twelve o'clock position on the guide chute 25, as viewed more clearly in FIG. 1.

Frame 20 includes deflector rail 28, which is affixed to the upper wall 29 and projects downward from the upper wall 29 toward the working surface 11a. Deflector rail 28 is situated inboard of guide chute 25 and has a sharper curvature than the guide chute 25. The deflector rail 28 begins at the nine o'clock position and terminates at about the eleven o'clock position adjacent sensor assembly 40. The purpose of deflector rail 28 is to insure that caps rotating with and on the central portion of the working surface 11a of disk 11 do not bounce or are not flung by centrifugal force through the first discharge opening 48 into the sensing position directly beneath sensor assembly 40, or into the guide chute just beyond the ejection assembly 45.

Prior to the midpoint of the path of guide chute 25, or at about the 11 o'clock position on the orbital cap selection device 10, is a sensor asssembly 40. Sensor assembly 40 is suitably mounted to the outer surface of outer circumferential wall 22 and projects into the body of the selection device 10 through sensor assembly opening 22a (FIG. 2). in the preferred embodiment, sensor assembly 40 is an optical sensor that transmits a beam of light and receives that beam when it is reflected from a surface. Directly beneath sensor assembly 40 is a sensing opening 43 in the upper guide wall 27 of the guide chute 25.

While the operation of this sensor assembly 40 is explained more fully in the co-pending application, Ser. No. 101,853, fundamental aspects of its operation will be briefly explained. A beam of light transmitted by the sensor assembly 40 is directed through the sensing opening 43 and reflected back through the opening to be received by the sensor. In the preferred embodiment, sensor assembly 40 is calibrated to sense the closed side of a cap passing under sensing opening 43. If the cap is oriented with the closed side facing disk 11, such as cap C" in FIG. 2, the cap C" is permitted to continue in the procession by the sensor assembly 40.

The sensor assembly 40 generates a signal when an improperly oriented cap is detected. That signal is received by the ejection assembly 45 situated rotationally downstream from sensor assembly 40. Ejection assembly 45 includes an airjet nozzle 46 that is connected to a conventional air supply and is mounted to the outer circumferential wall 22. The nozzle is arranged to direct a puff of air radially inward across the working surface 11a and slightly downward over rim 12 of disk 11. When the ejection assembly 45 is activated by a signal from sensor assembly 40, a puff of air is emitted from the airjet nozzle 46. Air from the airjet nozzle acts on the improperly oriented cap as it passes by the nozzle to eject the cap from guide chute 25 through first ejection opening 48 in guide shell 26, pushing it back toward hub 13.

While the specifics of the sensor and air ejection assemblies are left to the co-pending application, Ser. No. 101,853, it can be stated here that with these means of cap selection, Applicants have been able to achieve cap feed rates of over 3000 parts per minute, which is nearly three times greater than the fastest feed rate previously achieved in prior art devices. While the preferred embodiment presently described uses an airjet to eject improperly oriented caps from the guide chute, other electrically activated means are contemplated to perform the same function. Moreover, while the airjet of the present invention has been described as being activated in response to a signal from the sensor assembly, other means for controlling an air stream contacting the procession of caps is also contemplated. For instance, means may be provided to alternately block and unclock the path of air exiting an air nozzle while air constantly flowing through the nozzle.

While the sensor assembly 40 and air ejection assembly 45 account for the dramatic improvement in cap selection speeds produced by Applicants' invention, it is desirable to provide additional insurance that the caps passing from the guide chute 25 into the discharge chute assembly 30 are all properly oriented. To provide this added factor of safety, a critical feature of Applicants' present invention is the addition of a starwheel assembly 50 downstream from the sensor and air ejection assemblies. While the details of this starwheel assembly 50 will be explained more fully herein, it can first be noted, with reference to FIG. 1, that the starwheel assembly 50 is located, in the preferred embodiment, at approximately the 1 o'clock position on the orbital cap selection device 10. The starwheel assembly includes a second ejection opening 49 formed in the guide shell 26, in a manner similar to the first ejection opening 48. The second ejection opening 49 is situated near the entrance 30a to the discharge chute assembly 30, signified by the junction between guide shell 26 and a guide side wall 38 that forms part of the discharge chute assembly.

The lower edge of guide side wall 38 is situated slightly above working surface 11a (not shown in the figures), just as guide shell 26 is in the originating portions of guide chute 25. Guide side wall 38 keeps properly oriented caps C", leaving the starwheel assembly 50, within the guide chute 25, and prevents caps disposed on working surfaces 11a from improperly entering guide chute 25. As illustrated in FIG. 1, guide side wall 38 is recessed from containment shell 24.

As with the sensor and air ejection assemblies, detailed description of the discharge chute assembly 30 is left to Applicants' co-pending application, Ser. No. 101,853, which has been incorporated by reference. Certain elements of the chute assembly 30 are illustrated in FIG. 1. The discharge chute assembly includes ramp 32 that is constructed or fairly thin material so that leading edge 32a is flush with working surface 11a. A tongue (not shown) projecting from the bottom side of ramp 32 rides within a ramp positioning groove 11b (FIG. 2) around the perimeter of disk 11. The ramp 32 is a flattened S-shape so that the ramp can clear rim 12 of the rotating disk 11, while providing a smooth transition for the properly oriented cap C" from the rotating disk to the discharge chute assembly 30. Guide side wall 38 forms an interior wall adjacent to the ramp 32. Guide side wall 38 continues along the length of discharge chute assembly 30 to form one side of the discharge chute. Side wall 35 forms the opposite side wall. Thus, the discharge chute is formed by ramp 32, guide side wall 38, side wall 35 and a discharge chute cover 34. Discharge chute assembly 30 terminates in a discharge opening 36 that can be mated to a chute or track of a separate cap manipulation device, such as a machine that affixes the caps to a bottle or container.

In order to assist entry of the properly aligned cap C" onto discharge ramp 32, a discharge assist assembly 39 is provided. Discharge assist assembly 39 includes an airjet nozzle 39a that is directed toward ramp 32 so that as the cap C" is flung onto ramp 32 by the rotation of disk 11, the cap gets an extra assist from a continuous puff of air from airjet nozzle 39a. The puff of air from airjet nozzle 39a helps the C" to negotiate the S-shape of ramp 32 until it reaches a point on the ramp at which gravity will help pull the cap through the discharge chute assembly 30 due to the incline of selection device 10.

The details of the starwheel assembly 50 of the present invention will now be described with reference to the figures, particularly FIGS. 3-7. The starwheel assembly 50 includes a starwheel 52 that is mounted to the outer circumferential wall 22 of the frame 20. A shoulder bolt 53 passes through a bushing 72 (FIG. 5) in a central bore in the starwheel 52, and is threaded or otherwise engaged with mounting bracket 54 on the opposite side of the starwheel 52, that is the radially innermost side of the starwheel closest to the working surface. The mounting bracket 54 extends vertically toward the top of the orbital cap selection device 10, where it mates with a mounting block 55. The mounting block 55 passes over the starwheel and is suitably affixed to the outer circumferential wall 22, such as by welding or by bolts. The mounting bracket 54 is attached to the mounting block 55 by way of a pair of positioning dowels 56 and a fastener 57, such as a threaded bolt.

Figure 3:
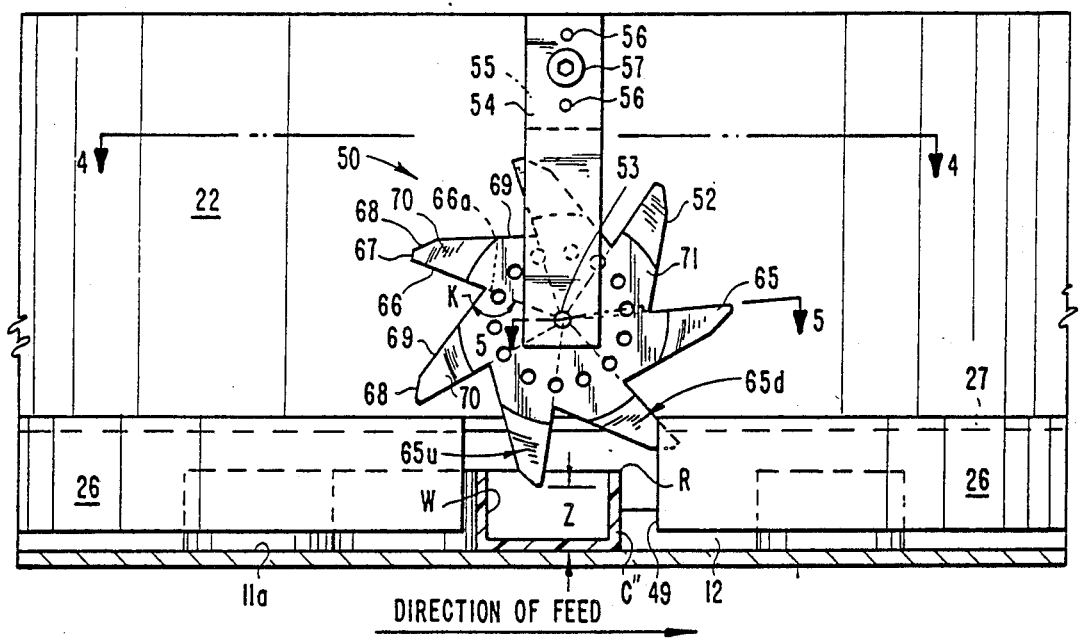
FIG. 3 is an enlarged partial cross-sectional view taken along the line 3—3 in FIG. 1, as viewed in the direction of the arrows, showing specifically the starwheel cap selecting apparatus of the present invention.

The starwheel 52 is oriented so that the starwheel projects through a starwheel opening 60 (FIG. 4) in the upper guide wall 27. The starwheel 52 is vertically oriented relative to the working surface 11a of the rotating disk 11, so that the spokes 65 of the starwheel have their closest approach to the working surface at a dimension Z, as shown in FIG. 3. The importance of this dimension will become apparent from the detailed description to follow.

Figure 4:
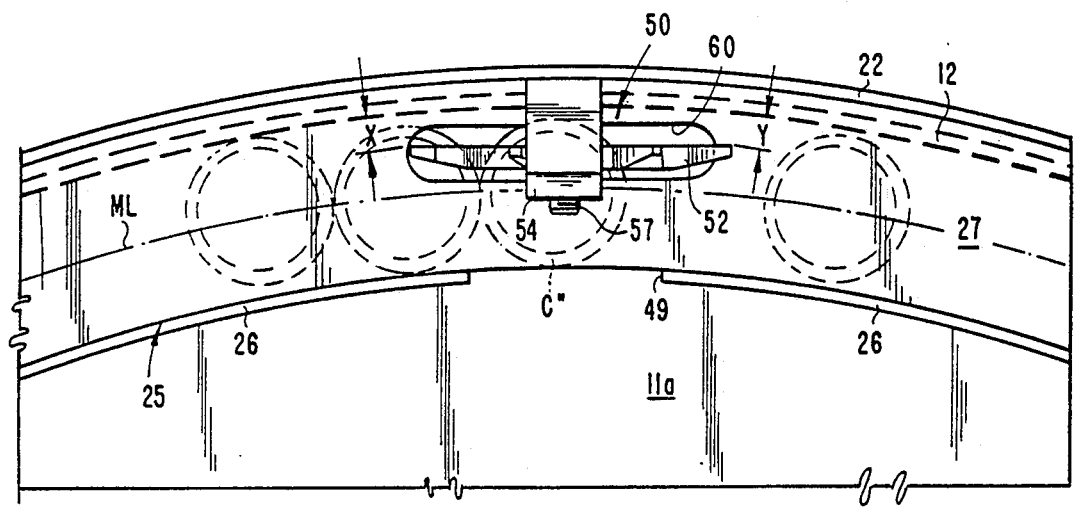
FIG. 4 is a top elevational view taken along the line 4—4 in FIG. 3, as viewed in the direction of the arrows.
Figure 5:
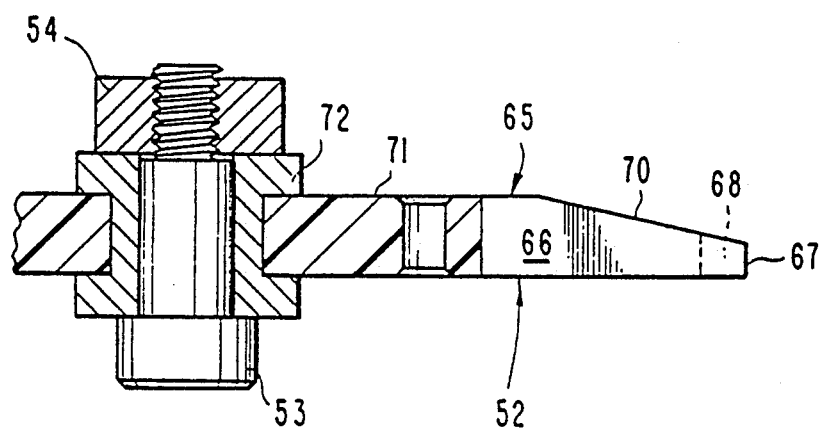
FIG. 5 is an enlarged cross-sectional view of the starwheel, taken along the line 5—5 in FIG. 3, as viewed in the direction of the arrows.
Figure 6:
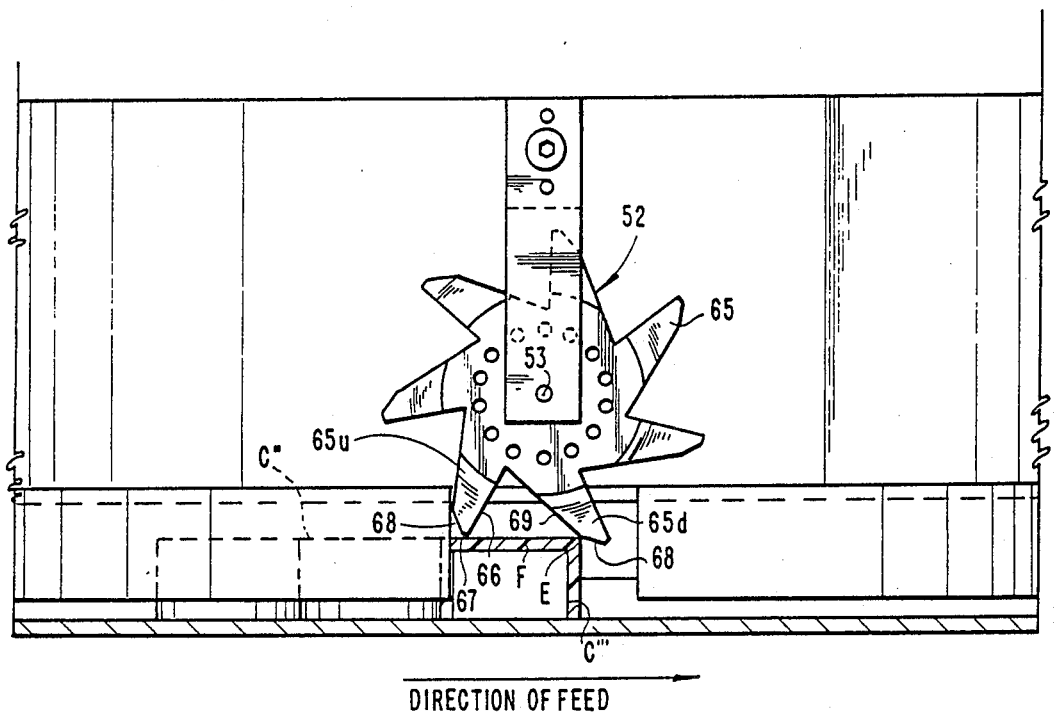
FIG. 6 is an enlarged partial cross-sectional view showing the starwheel cap selecting apparatus, as viewed in FIG. 3 but with the starwheel engaging an improperly oriented cap.

The second ejection opening 49 in the guide shell 26 is situated radially inboard of the starwheel 52. In the preferred embodiment, the starwheel is arranged at an angle relative to a tangent defined between the vertical edges of the second ejection opening 49. Thus, as illustrated in FIG. 4, the radial inboard dimension of the upstream portion of the starwheel 52 is at a dimension X from the rim 12 of the rotating disk 11. The downstream portion of the starwheel 52 is at a dimension Y from the rim 12, such that the dimension Y is greater than the dimension X. The importance of this dimensional orientation of the starwheel 52 will be described witth reference to the operation of the starwheel assembly 50.

The starwheel 52 comprises a plurality of spokes 65 (FIG. 3). The number of spokes 65 are determined largely by the diameter of the cap C" that is to be fed past the starwheel assembly 50. In the preferred embodiment, for a cap having an outer diameter of approximately 1 and ¼ inches, the starwheel 52 includes seven spokes evenly spaced around the circumference of the wheel. The spokes 65 are uniquely shaped, in that the spokes include a radial edge 66 that lies along a radial line 66a emanating from the shoulder bolt 53 at the center of the starwheel. Each of the spokes 65 includes a flat or slightly rounded tip 67 at the free end of radial edge 66. The starwheel 52 is oriented so that the radial edge 66 faces the downstream direction. At the upstream portion of the spoke 65, the tip 67 extends into a chamfered relief edge 68. The relief edge 68 merges into a sloping edge 69, that forms an obtuse angle K with the radial line 66a. As shown in the side view of the starwheel in FIG. 5, each spoke includes a beveled cam surface 70 on the starwheel inboard face 71 that faces the working surface 11a and the second ejection opening 49.

The geometry of the spokes 65 is important to the function of the orbital cap selection device 10 of the present invention. When a cap is properly oriented, such as a cap C" shown in FIG. 3, the rim R of the cap C" contacts the sloping edge 69 of the downstream spoke 65d to rotate the starwheel 52 in a counterclockwise direction, as shown by the arrow. As the starwheel 52 rotates, the upstream spoke 65u enters the open end of the cap C", as shown in FIG. 3. As the cap C" progresses downstream, the upstream portion of the rim R of cap C" contacts the sloping edge 69 of the upstream spoke 65u to cause the starwheel to rotate further.

As the cap C" progresses downstream, and the starwheel 52 rotates in the counterclockwise direction, the upstream portion of rim R of cap C" slides along the sloping edge 69 and the chamfered relief edge 68 of the upstream spoke 65u until it clears the spoke. Thus, it is apparent, that when the starwheel assembly 50 encounters a properly oriented cap, such as cap C" in FIG. 3, the starwheel 52 will "free-wheel", or spin, in the counterclockwise direction as it is contacted by the flow of caps carried along the rotating disk 11.

As shown in the top section view of FIG. 4, the starwheel assembly 50 is offset from the meanline ML of the procession of caps passing by the starwheel station. The meanline ML corresponds generally to a line of centers of the procession of caps. Moreover, the inboard face 71 of the starwheel is canted slightly relative to a tangent to the meanline ML, due to the difference in the distance X and Y as previously described. Consequently, the spokes of the starwheel will not enter a properly oriented cap along a diameter of the cap where the cap opening facing the spokes is greatest. Instead, the spokes will enter the open end of the cap C" in the outboard hemisphere of the moving cap. Because the starwheel is so oriented relative to the moving caps, the length of each spoke, measured in terms of the distance Z from the working surface (FIG. 3) must be properly established to provide clearance for the tip 67 of the spoke from the upstream portion of the rim R of the cap as the starwheel rotates. Additional clearance between the spoke and the cap rim R is provided by the chamfered relief edge 68 on the upstream portion of the spoke 65. With this configuration of the starwheel and spokes, the spokes can freely enter and exit a properly oriented cap C" without becoming lodged in the cap and jamming the procession of caps to the discharge chute assembly 30.

Thus far, the operation of the starwheel assembly 50 has been described with respect to a properly oriented cap C". However, when an improperly oriented cap is encountered, such as cap C'" in FIGS. 6 and 7, the rotation of the starwheel 52 ceases. In this instance, the starwheel cannot rotate because the improperly oriented cap C'" is essentially trapped between the upstream spoke 65u, the downstream spoke 65d, and the rotating disk 11. When the starwheel stops rotating, the procession of caps, whether properly oriented or not, is interrupted. It is also possible for a properly oriented cap, that had entered the starwheel station immediately before the upside down cap C'", to be held in place by the downstream spoke 65d still engaged within the open end of the cap C". Since the rotation of the starwheel 52 is interrupted as soon as the tip 67 of the upstream spoke 65u contacts the floor F of the improperly oriented cap C'", the downstream spoke 65d cannot rotate free of the properly oriented cap downstream of cap C'".

As the cap C'" is delayed at the starwheel assembly station, other caps continue to collect in the guide chute 25 behind the cap C'", thereby exerting pressure on the upstream portion of cap C'". Moreover, the rotation of the disk 11 beneath the cap C'"tries to force the cap downstream. In addition, the spokes of the starwheel themselves urge the cap C'" inboard toward the working surface, due to the unique design of the starwheel assembly 50. Since the starwheel 52 is offset outboard of the meanline ML of the procession of caps, it tends to push the cap C''' radially inboard. The beveled cam surface 70 allows the tip 67 contacting the cap floor F to be situated further outboard of the meanline ML. Also, the beveled cam surface 70 of the starwheel provides an additional radial push as the cap C''' starts to gradually move inboard toward the working surface 11a. After the cap has moved sufficiently inboard, the floor F of the cap contacts the cam surface 70, incrementally moving up the cam surface, which movement forces the cap further inboard. It can be noted that at this point, the cap C''' has cleared the tip 67 of the spoke and the spoke is allowed to rotate again.

Figure 7:
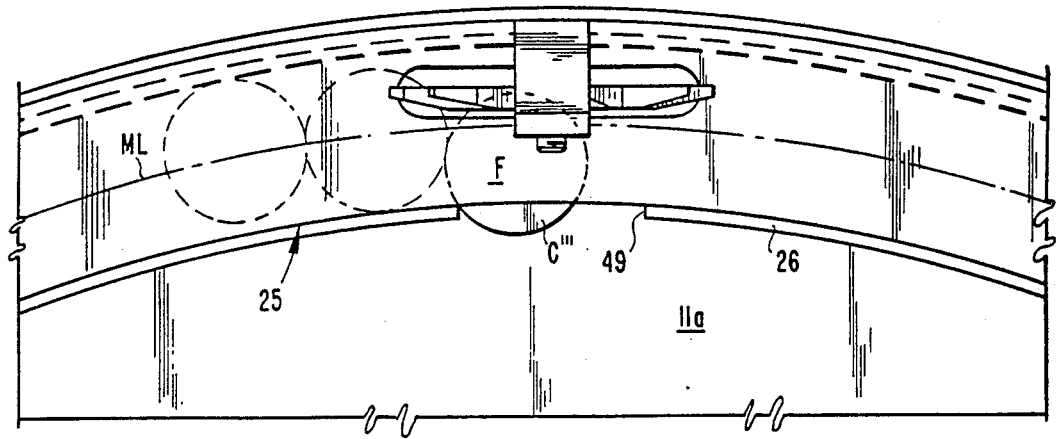
FIG. 7 is a top plan view of the starwheel cap selecting apparatus shown in FIG. 6.

The self-clearing feature of the starwheel assembly 50 of the present invention is provided as the pressure continues on cap C'''. The pressure of the upstream caps, combined with the rotation of the disk below the cap and the urging of the starwheel spokes 65, causes cap C''' to gradually "bubble" away from the starwheel 52 toward the second ejection opening 49 in guide shell 26, as shown in FIG. 7. As the cap C''' clears the starwheel, its motion includes a radially inward component, imparted by the starwheel and the upstream caps, and a rotationally downstream component, imparted by the rotating disk 11. The second ejection opening 49 is arranged relative to the starwheel 52 so that the improperly oriented cap C''' will clear the opening when it is ejected by the starwheel assembly. Once the improperly oriented cap C''' slides through the second ejection opening 49, the upstream caps proceed through the starwheel assembly to strike the downstream cap C'' and cause the starwheel 52 to start its freewheel rotation again.

From the foregoing description of the operation of starwheel assembly 50, it is apparent that the relative geometry between the starwheel 52, its spokes 65, the guide chute 25, and the second ejection opening 49, are important. The second ejection opening 49 must be not only wide enough to accommodate an improperly oriented cap C''', it must also be wide enough to allow the ejected cap C''' to exit the guide chute 25 after "bubbling" out of the starwheel assembly 50, and while it is being carried downstream by the rotation of the disk 11. The overall length of the spokes 65 is also important, so that as the starwheel assembly 50 encounters a spring of properly oriented caps, the slopeing edge 69 will be continually pushed by the upstream portion of the cap wall W of a properly oriented cap C'', as shown in FIG. 3, until the starwheel 52 has rotated sufficiently to allow the next spoke to enter the next upstream properly oriented cap. Since an improperly oriented cap C''' must slide against the tip 67 and cam edge 68 of a given spoke 65, the starwheel 52 is composed of a material such as LEXAN, that provides a generally smooth, low-friction surface. In addition, a material such as LEXAN has adequate wear resistance to accommodate the long running times of the orbital cap selection 10 and to endure the high free-wheel rotational rates provided by the selection device of the present invention.

Returning to FIG. 1, the starwheel assembly 50 is situated downstream from the sensor assembly 40 a distance D. As described above, when an improperly oriented cap is encountered by the starwheel assembly 50, the improperly oriented cap essentially stops the flow of caps through the guide chute 25, at least until the cap "bubbles" out through the second ejection opening 49. During this time, however, caps passing by the sensor assembly 40 accumulate behind the improperly oriented cap, providing pressure on the cap to force it out through the second ejection opening. The distance D that the starwheel assembly 50 is displaced from the sensor assembly 40 is calibrated to allow an adequate accumulation of caps behind the improperoly oriented cap, without causing the flow of caps to back-up into the sensor assembly 40 and air ejection assembly 45.

The starwheel assembly 50 of the present invention represents a means to approach as near 100% cap selection accuracy as is possible with an orbital cap selection device. In the preferred embodiment, the starwheel assembly 50 is used in conjunction with an upstream cap selection means, such as sensor assembly 40 and air ejection assembly 45. With this embodiment, high cap feed rates, approaching 3000 caps per minute, can be achieved using the sensor assembly 40 as the primary caps selection means. The starwheel assembly 50, then, is a secondary cap selection means that provides additional assurance that improperly oriented caps are not being directed to the discharge chute assembly 30. Since the starwheel 52 of the starwheel assembly 50 is freewheeling, in that its rotation is controlled by pressure from caps flowing through the discharge chute 25, the starwheel assembly 50 does not appreciably slow down properly oriented caps traveling through the discharge chute 25. A slight reduction in cap feed rate may be experienced when an improperly oriented cap is detected by the starwheel assembly and ejected back into the working surface 11a of the rotating disk 11 by the bubbling effect of the starwheel sorting. However, with an adequate distance D between the starwheel assembly and the sensor and air ejection assemblies 45, the reduction in cap feed rate should not be noticeable. Thus, it is seen from the foregoing that the present invention produces an orbital cap selection device that is capable of both high cap feed rates and virtually 100% accuracy in cap selection.

Although in the preferred embodiment the starwheel assembly 50 is used in conjunction with an upstream sensor and selection means, the starwheel assembly 50 can also be used as the only cap selection and ejection means for an orbital cap selection device. In this instance, it is apparent that the high cap feed rates achieved with Applicants' preferred embodiment, will not be achieved when a starwheel assembly 50 along is providing the selecting and ejection function.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. An apparatus for feeding caps, comprising:
   a disk rotatable about its normal axis and having a peripheral portion and a working surface;
   means for containing caps disposed on said disk during rotation of said disk, each of said caps having a closed end and an open end;
   primary cap selecting means for selecting properly oriented caps from a procession of caps rotating with said disk at said peripheral portion and for ejecting improperly oriented caps onto said working surface;
   secondary cap selecting means, rotationally downstream from said primary cap selecting means, for engaging every cap passing said primary selecting means such that properly oriented caps are permitted to pass said secondary selecting means and improperly oriented caps are ejected from said peripheral portion, said secondary cap selecting means including self-clearing means for interrupting said procession of caps at said secondary cap selecting means as said disk is rotating by restraining the downstream rotation of an improperly oriented cap, whereby the interrupted procession of caps exerts pressure on said improperly oriented cap sufficient to urge said improperly oriented cap from said peripheral portion onto said working surface, and further whereby said procession of caps past said secondary cap selecting means resumes when said improperly oriented cap is urged from said peripheral portion; and a stationary discharge chute intersecting said peripheral portion for feeding properly oriented caps after they have passed said secondary cap selecting means.

2. The apparatus of claim 1, wherein said primary cap selecting means includes:

sensing means for producing a signal responsive to the orientation of caps rotating with said disk at said peripheral portion;

means for ejecting an improperly oriented cap from said peripheral portion in response to the signal from said sensing means.

3. The apparatus of claim 2, wherein:

said sensing means comprises an optical sensor, wherein a light beam emitted by said optical sensor is reflected back to said sensor by a cap rotating on said peripheral portion.

4. The apparatus of claim 2, wherein:

said ejecting means includes an air jet directed generally radially inwardly along the surface of said disk across said peripheral portion, whereby caps rotating on on said peripheral portion are ejected from said peripheral portion when acted on by air from said air jet.

5. The apparatus of claim 4, wherein:

said sensing means comprisess an optical sensor, wherein a light beam emitted by said optical sensor is directed toward said peripheral portion and is reflected back to said sensor by a cap rotating on said peripheral portion, and said sensing means generates an electrical signal when the cap is in an improper orientation; and said ejecting means is electrically actuated in response to said electrical signal.

6. An apparatus for feeding caps, comprising:

a disk rotatable about its normal axis and having a peripheral portion and a working surface;

means for containing caps disposed on said disk during rotation of said disk, each of said caps having a closed end and an open end;

cap selecting means for engaging every cap in a procession of caps rotating with said disk at said peripheral portion passing said cap selecting means such that properly oriented caps are permitted to pass said selecting means and improperly oriented caps are ejected from said peripheral portion, said cap selecting means including self-clearing means for interrupting said procession of caps at said cap selecting means as said disk is rotating by restraining the downstream rotation of an improperly oriented cap, whereby the interrupted procession of caps exerts pressure on said improperly oriented cap sufficient to urge said improperly oriented cap from said peripheral portion onto said working surface, and further whereby said procession of caps past said cap selecting means resumes when said improperly oriented cap is urged from said peripheral portion; and a stationary discharge chute intersecting said peripheral portion for feeding properly oriented caps after they have passed said cap selecting means.

* * * * *